United States Patent
Jakovcic

(10) Patent No.: US 12,026,452 B1
(45) Date of Patent: Jul. 2, 2024

(54) CONFIDENTIALITY FILTER FOR AI CONTENT ENHANCEMENT

(71) Applicant: Fusion Capital Management LLC, Woodbridge, NJ (US)

(72) Inventor: Bryan J. Jakovcic, Woodbridge, NJ (US)

(73) Assignee: Fusion Capital Management LLC, Woodbridge, NJ (US)

( * ) Notice: Subject to any disclaimer, the term of this patent is extended or adjusted under 35 U.S.C. 154(b) by 0 days.

(21) Appl. No.: 18/351,923

(22) Filed: Jul. 13, 2023

(51) Int. Cl.
*G06F 40/166* (2020.01)
*G06F 16/38* (2019.01)
*G06F 21/60* (2013.01)

(52) U.S. Cl.
CPC ............ *G06F 40/166* (2020.01); *G06F 16/38* (2019.01); *G06F 21/60* (2013.01)

(58) Field of Classification Search
CPC .................................................. G06F 40/166
See application file for complete search history.

(56) References Cited

U.S. PATENT DOCUMENTS

| | | | |
|---|---|---|---|
| 2018/0260734 A1* | 9/2018 | Beveridge et al. | G06N 99/005 |
| 2022/0269820 A1* | 8/2022 | Singh Bawa et al. | G06F 21/6254 |
| 2023/0281330 A1* | 9/2023 | Levay et al. | G06F 21/6218 |

OTHER PUBLICATIONS

PrivateGPT: The Privacy Layer for Chatgpt. Private AI. (Jun. 4, 2023). [retrieved on Dec. 7, 2023]. retrieved from Internet Archive WayBackMachine <URL:https://web.archive.org/web/20230604103833/https://www.private-ai.com/solutions-privat-egpt/>.

Products—text. Private AI. (Mar. 20, 2023). [retrieved on Dec. 7, 2023]. Retrieved from Internet Archive WayBackMachine<URL:https://web.archive.org/web/20230320115623/https://www.private-ai.com/text/>.

Identify, redact & replace pii. Private AI. (2023, June 4). [retrieved on Dec. 7, 2023]. Retrieved from Internet Archive WayBackMachine<URL:https://web.archive.org/web/20230604102310/https://www.private-ai.com/>.

* cited by examiner

*Primary Examiner* — James J Debrow
(74) *Attorney, Agent, or Firm* — Maine Cernota & Curran

(57) ABSTRACT

A method of enabling a remotely hosted AI to enhance a document while withholding sensitive information from the AI includes identifying sensitive terminology associated with the sensitive information and replacing by an exclusion filter of the sensitive terminology with redaction markers that cannot be interpreted as misspelled words or coined terms, thereby creating a redacted draft that is submitted to the AI. Upon receiving an enhanced, redacted draft from the AI, the original sensitive terminology is restored in place of the redaction markers, and the resulting enhanced document is delivered to a user. Sensitive terms can be local or global. Globally sensitive terms can be stored in databases directed to categories of sensitive information. Sensitive terms can include indicators directed to sensitive numerical quantities and/or other targets. In embodiments, the exclusion filter automatically corrects any grammatical errors arising from replacement of the redaction markers by the original sensitive terminology.

18 Claims, 2 Drawing Sheets

CONFIDENTIALITY FILTER FOR AI CONTENT ENHANCEMENT

FIELD OF THE INVENTION

The invention relates to artificial intelligence (AI), and more particularly, to methods of soliciting and receiving AI-enhanced documents from a remotely-hosted AI.

BACKGROUND OF THE INVENTION

Artificial intelligence (AI) is rapidly finding application in wide variety of fields of endeavor. Two of the most practical applications of AI, which are rapidly being adopted and effectively used, are AI document enhancement and AI-document generation. As used herein, the term "AI document enhancement" refers to AI applications in which a user generates a "draft" of a document that contains a significant amount of information, and then submits the draft to an AI for enhancement, whereby the AI improves the clarity and structure of the document, and possibly suggests additions and/or corrections. The term "AI document generation" refers herein to applications in which the user submits a query, such as key words and/or simple instructions, and in response the AI generates a desired document.

Examples of AI document enhancement include, but are not limited to, enhancement of essays, reports, resumes, and any other written content. For instance, a user might create a first draft of an internal business memo, an engineering report, or a book manuscript, which might then be improved by an AI in its clarity and accurate use of English by making corrections to the vocabulary and/or sentence structure, and by replacing terms coined by the user with accepted terms of art. The AI might even improve the content, for example by suggesting additional examples and/or citations that further support the author's assertions. Examples of AI-generated documents might include entry by a user of a few key words or instructions, such as "commodity investment strategy," or "three paragraph essay about Abraham Lincoln," whereupon the AI would generate an appropriate strategy report or essay based upon the training that it has previously received from other sources.

The widespread use of AI for document enhancement and generation is being driven largely by the availability of AI engines that are remotely hosted by third parties. Typically, a user will submit a document or a query via the internet to an online AI, and will receive the enhanced or generated document from the AI via the internet in return.

Of course, the effectiveness and quality of AI document enhancement and generation depends very strongly on the availability of training data for the AI. It is the quality, and especially the quantity, of the available training data that largely determines the quality and effectiveness of an AI. As such, the "hunger" of an AI for training data can never be sated. For this reason, in most cases, any information that is submitted to an AI, including documents that are submitted by users for enhancement, are retained by the AI and added to its training data set. This can be especially crucial for AI applications that focus on specific areas of application, such as predicting financial trends or enhancing automotive engineering reports. For such specialized AIs, the documents that are submitted by users are necessarily directed to their designated areas of specialization, and therefore tend to serve as highly pertinent training data.

Many users who submit documents for enhancement by an externally hosted AI are unconcerned, or even unaware, that their submitted documents are being used to train the AI. However, the fact that an AI will typically absorb, and potentially re-use, any information that it receives can give rise to significant concerns for some users, and can limit their use of a remotely hosted AI, thereby limiting the benefits that they can derive from AI. For example, if a marketing executive has identified a potentially new and promising marketing strategy for selling luxury vehicles, he may hesitate to allow an online AI to enhance his internal corporate reports and proposals, for fear that his new marketing strategy may be revealed to a competitor who has submitted a request to the same AI to generate a new marketing approach for selling high-cost automobiles.

What is needed, therefore, is a method of enabling a remotely hosted AI to enhance a document, while at the same time maintaining the confidentiality of sensitive information included in the document.

SUMMARY OF THE INVENTION

The present invention is a method of enabling a remotely hosted AI to enhance a document, while at the same time maintaining the confidentiality of sensitive information included in the document. Specifically, the present invention is a locally hosted, software-implemented exclusion filter that prevents sensitive or confidential information from reaching a remotely-hosted AI by "excluding" the sensitive information from the document as submitted to the AI, while having little if any impact on the ability of the AI to enhance the document.

It will be noted that the term "document" is used herein to refer to any text-based content written in a document "language" that can potentially be improved by an artificial intelligence engine ("AI"). By "text-based," it is meant that the document consists of a plurality of symbols that are selected from among a symbol set that is supported by a document standard. For example, the document may consist of letters, numbers, and other symbols that are supported by the "rich text format" (.rtf) document standard. Examples of documents include, but are not limited to, reports, essays, technical manuals, letters, and drafts of emails, among many others. The term "sensitive information" is used herein to refer to any information that a user wishes to withhold from disclosure to a remotely hosted AI.

According to the present invention, a user submits a draft document that includes sensitive information to the exclusion filter. The sensitive information is characterized by one or more words, phrases, and/or indicators which, if omitted, will successfully cause the sensitive information to be excluded from the document. These sensitive words, phrases, and/or indicators are referred to herein collectively as the "sensitive terminology," and individually as the "sensitive terms," that are associated with the sensitive information.

The term "indicator" is used herein to refer to a word or phrase that may not, of itself, be sensitive, but which will generally "point" to sensitive information. For example, the indicator phrase "a temperature of" is not necessarily sensitive as such, but will typically be followed by a numerical value or phrase ("target value") such as "at least 300 degrees" that may be sensitive. Similarly, the indicator "pounds" may be preceded by a "sensitive" value such as "25." In various embodiments, the exclusion filter can be instructed to exclude both a sensitive indicator and its target value, or to omit only the target value.

According to the invention, the exclusion filter is made aware of the sensitive terminology, based upon which it then creates a "redacted" draft by replacing all of the sensitive terminology in the draft with "redaction markers," thereby excluding the sensitive information from the redacted draft. The redacted draft is submitted to the remotely hosted AI, which returns an enhanced redacted draft that will, in general, contain most or all of the redaction markers. Upon receiving the enhanced redacted draft, the exclusion filter replaces the redaction markers with the original sensitive terminology to create an enhanced document that is delivered to the user. In embodiments, the exclusion filter automatically corrects any grammatical errors in the enhanced document that may have arisen due to the replacement of the redaction markers in the enhanced, redacted draft with the original sensitive terminology.

In embodiments, the sensitive information and associated sensitive terminology are identified by a user, who manually identifies the sensitive terminology to the exclusion filter, for example by underlining or highlighting the sensitive terminology in the draft document, or by surrounding the sensitive terminology with square brackets or other predetermined symbols. In embodiments, for each term that is identified as being sensitive, the user can indicate whether it is only that occurrence of the term that is sensitive, or whether all occurrences of that term are sensitive. In other words, each sensitive term can be defined as "locally" sensitive or "globally" sensitive. In various embodiments, the user can instruct the exclusion filter to consider all of the sensitive terminology to be global or all of the sensitive terminology to be local. Or the user can indicate to the exclusion filter that each identification of a sensitive term will be accompanied by a designation of the term as being locally or globally sensitive.

In various embodiments, when an indicator is indicated to be globally sensitive by a user, the user can choose an example for which to indicate the target value. Based on this example, in embodiments, the exclusion filter can, by analogy, identify the target values of any other occurrences of the indicator in the draft document, even when the target values are not all identical. Embodiments provide an opportunity for the user to review the redacted draft before it is sent to the AI.

The redaction markers can be any characters or groups of characters that is/are supported by the document standard of the draft document, so long as a unique redaction marker is associated with each unique sensitive term, and so long as the redaction markers are highly unlikely to be interpreted by the AI as representing an actual word or phrase, and is also highly unlikely to be interpreted by the AI as being a word that has been "coined" by the user. For example, it is important that a redaction marker will not be interpreted as a misspelled word that is known to the AI and should be corrected, or a coined term that should be replaced by a term of art. Instead, redaction markers must be chosen that will likely be interpreted by the AI as being actual words or phrases that simply are not known to the AI and should be left unchanged. In embodiments, the exclusion filter automatically interprets the addition of the letter "s" or letters "es" to a sensitive term as representing the plural of the sensitive term. Embodiments of the disclosed exclusion filter are able to generate randomized redaction markers that are changed from one document to the next, thereby reducing any chance that the AI will attempt to add the redaction markers to its vocabulary.

In some embodiments, previously entered globally sensitive terminology is stored in a database, or in a plurality of databases, that can be reference by users in the future who wish to exclude similar content from their documents. In some of these embodiments, the databases are directed to specified categories of sensitive terminology, thereby allowing users to easily tailor the sensitive content that is to be excluded from their draft documents. According to this approach, sensitive terms can be included in more than one of the databases if they are relevant to more than one of the sensitive information categories.

A first general aspect of the present invention is a method of enabling a remotely hosted artificial intelligence engine ("AI") to enhance a draft document containing sensitive information without revealing the sensitive information to the AI, the draft document being written in a document language and consisting of a plurality of symbols selected from a symbol set that is supported by a document standard. The method includes providing the draft document to a locally hosted exclusion filter, identifying to the exclusion filter at least one sensitive term included in the draft document, the removal of which would eliminate the sensitive information from the draft document, creating by the exclusion filter of a redacted draft by replacing each of the identified sensitive terms in the draft document with a corresponding redaction marker, a unique one of the redaction markers corresponding with each unique one of the sensitive terms, each of said redaction markers consisting of one or more symbols that are supported by the document standard, none of the redaction markers including any series of symbols that is identical to, or confusingly similar to, any word included in the document language, submitting by the exclusion filter of the redacted draft to the AI, receiving by the exclusion filter of an enhanced redacted draft created by the AI from the redacted draft, said enhanced redacted draft including at least one of the redaction markers, creating by the exclusion filter from the enhanced redacted draft of an enhanced document by exchanging the redaction markers in the enhanced redacted draft with the corresponding sensitive terms, and presenting the enhanced document to a user.

In embodiments, the sensitive terms comprise at least one of a sensitive word, a sensitive phrase, and a sensitive indicator.

In any of the above embodiments, identifying the at least one sensitive term to the exclusion filter can include designating each of the sensitive terms as being a locally sensitive term, wherein only one nor more specific occurrences of a term are designated to be sensitive terms, or a globally sensitive term, wherein all occurrences of the term are designated to be sensitive terms. In some of these embodiments, identifying the at least one sensitive term to the exclusion filter includes designating by a user of at least one term as a globally sensitive term, and wherein the method further comprises adding said user-designated globally sensitive term to a database of globally sensitive terms. And in some of these embodiments, the designated database of globally sensitive terms is a database of sensitive terms that are deemed to be pertinent to a selected document category.

In any of the above embodiments, identifying the at least one sensitive term to the exclusion filter can include specifying to the exclusion filter a database of globally sensitive terms, and identifying by the exclusion filter of all occurrences in the draft document of terms that are included in the specified database as being globally sensitive terms.

In any of the above embodiments, the method can further comprise correcting by the exclusion filter of at least one document error in the enhanced document arising from the exchanging by the exclusion filter of the redaction markers in the enhanced redacted draft with the corresponding sensitive terms.

In any of the above embodiments, identifying the at least one sensitive term to the exclusion filter can include identifying to the exclusion filter a sensitive indicator directed to a sensitive target. In some of these embodiments, identifying to the exclusion filter the sensitive indicator includes identifying whether both the indicator and the target should be replaced by redaction markers, or only the target should be replaced by a redaction marker. In any of these embodiments, the sensitive indicator can be a globally sensitive indicator having a plurality of occurrences thereof in the draft document, identifying to the exclusion filter the sensitive indicator can include selecting by a user of one of the occurrences in the draft document of the sensitive indicator as an example occurrence, and the method can further include identifying as an example target the target to which the example occurrence of the indicator is directed, and based upon the example occurrence and the example target, identifying by the exclusion filter of the targets to which all of the other occurrences of the sensitive indicator in the document are directed.

In any of the above embodiments, identifying to the exclusion filter the at least one sensitive term can includes identifying of the sensitive term to the exclusion filter in a singular format thereof and interpreting by the exclusion filter of occurrences in the draft document of the identified sensitive term to which the letter "s" or the letters "es" have been appended to be occurrences of the sensitive term in a plural format thereof.

In any of the above embodiments, providing the draft document to the exclusion filter can include providing a first draft document and a second draft document to the exclusion filter, and the method can further include, for any sensitive term that occurs in both of the draft documents, replacing each occurrence of the sensitive term in the first draft document with a first redaction marker and replacing each occurrence of the sensitive term in the second draft document with a second redaction marker that is not identical to the first redaction marker.

A second general aspect of the present invention is non-transient media containing instructions stored therein that are configured, upon execution thereof by a computing device, to carry out the steps of receiving a draft document written in a document language and consisting of a plurality of symbols selected from a symbol set that is supported by a document standard, receiving identification of at least one sensitive term included in the draft document, creating a redacted draft by replacing each of the sensitive terms in the draft document with a corresponding redaction marker, a unique one of the redaction markers corresponding with each unique one of the sensitive terms, each of said redaction markers consisting of one or more symbols that are supported by the document standard, submitting of the redacted draft to an AI, receiving from the AI an enhanced redacted draft that includes at least one of the redaction markers, creating from the enhanced redacted draft an enhanced document by exchanging the redaction markers in the enhanced redacted draft with the corresponding sensitive terms, and presenting the enhanced document to a user.

In embodiments, the instructions are further configured, upon execution thereof by the computing device, to add user-designated globally sensitive terms to a database of globally sensitive terms.

In any of the above embodiments, the instructions can be further configured, upon execution thereof by the computing device, to identify all occurrences in the draft document of terms that are included in a specified database as being globally sensitive terms.

In any of the above embodiments, the instructions can be further configured, upon execution thereof by the computing device, to correct at least one document error in the enhanced document arising from the exchanging by the exclusion filter of the redaction markers in the enhanced redacted draft with the corresponding sensitive terms.

In any of the above embodiments, the instructions can be further configured, upon execution thereof by the computing device, to identify targets to which occurrences of a sensitive indicator in the document are directed according to an example occurrence of the indicator and target identified by the user.

In any of the above embodiments, the instructions can be further configured, upon execution thereof by the computing device, to interpret occurrences in the draft document of identified sensitive terms to which the letter "s" or the letters "es" have been appended to be occurrences of the sensitive terms in a plural format thereof.

And in any of the above embodiments, the instructions can be further configured, upon execution thereof by the computing device, to replace each occurrence of a sensitive term in first and second draft documents with corresponding first and second redaction markers that are not identical to each other.

In applications where a user relies mainly or entirely on pre-established databases of sensitive terminology, the action of the disclosed exclusion filter can be substantially "transparent" to the user, in that the user can submit a draft document containing sensitive information to a remotely hosted AI via the disclosed exclusion filter, and receive an enhanced document in return to which the sensitive information has been restored, without necessarily being aware that the sensitive information was excluded from the remotely hosted AI.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a method of enabling a remotely hosted AI to enhance a document while, at the same, time maintaining the confidentiality of sensitive information included in the document. Specifically, the present invention is a locally hosted, software-implemented "exclusion filter" that excludes sensitive or confidential information from reaching a remotely-hosted AI while having little if any impact on the ability of the AI to enhance the document.

Figure 1:
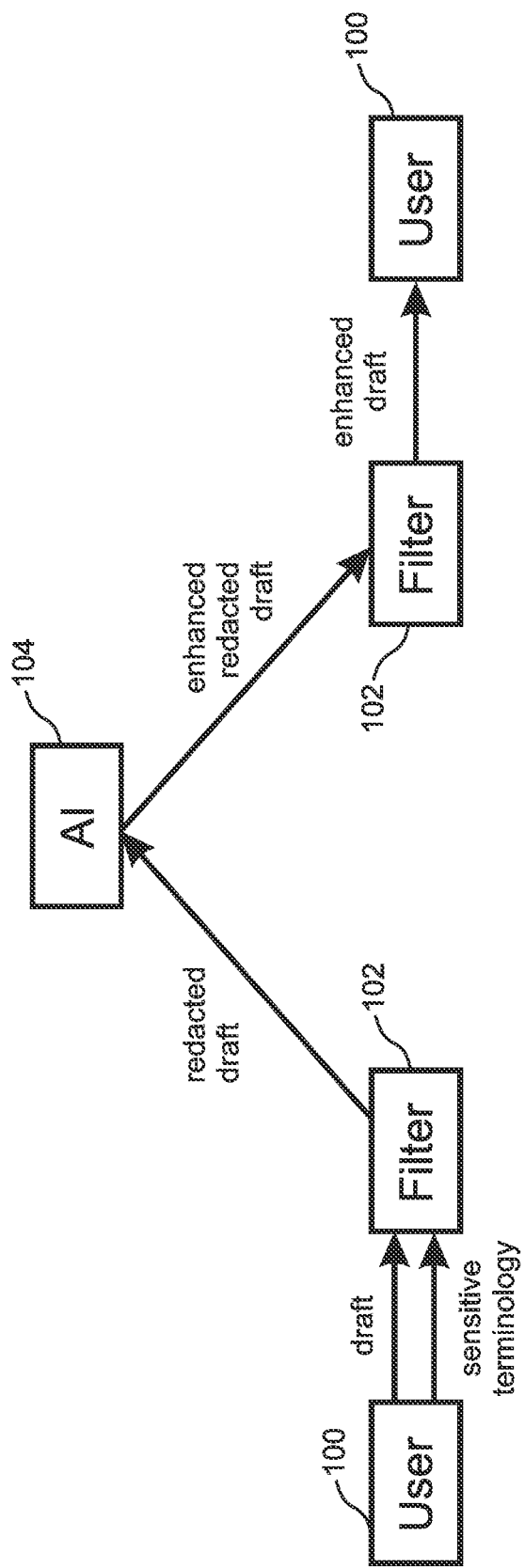
FIG. 1 is a block diagram that indicates steps of the disclosed method in an embodiment of the present invention.

With reference to FIG. 1, according to the present invention a user 100 submits a draft document that includes sensitive information to the exclusion filter 102, together with a list of sensitive terms comprising one or more words, phrases, or indicators that are associated with the sensitive information. The filter 102 then prepares a "redacted draft" by replacing all of the sensitive terms with redaction markers, and the forwards the redacted draft to the externally hosted AI 104. The AI prepares an enhanced redacted draft and returns it to the filter 102, which then restores the sensitive terminology in place of the redaction markers to create an enhanced document that includes the sensitive information. The enhanced document is then provided to the user 100. Note, that the presentation of each of the user 100 and the filter 102 in FIG. 1 as two separate blocks is only intended to indicate the flow of events (from left to right), and not to imply, necessarily, that two different users or two different filters are included in the disclosed method.

Figure 2:
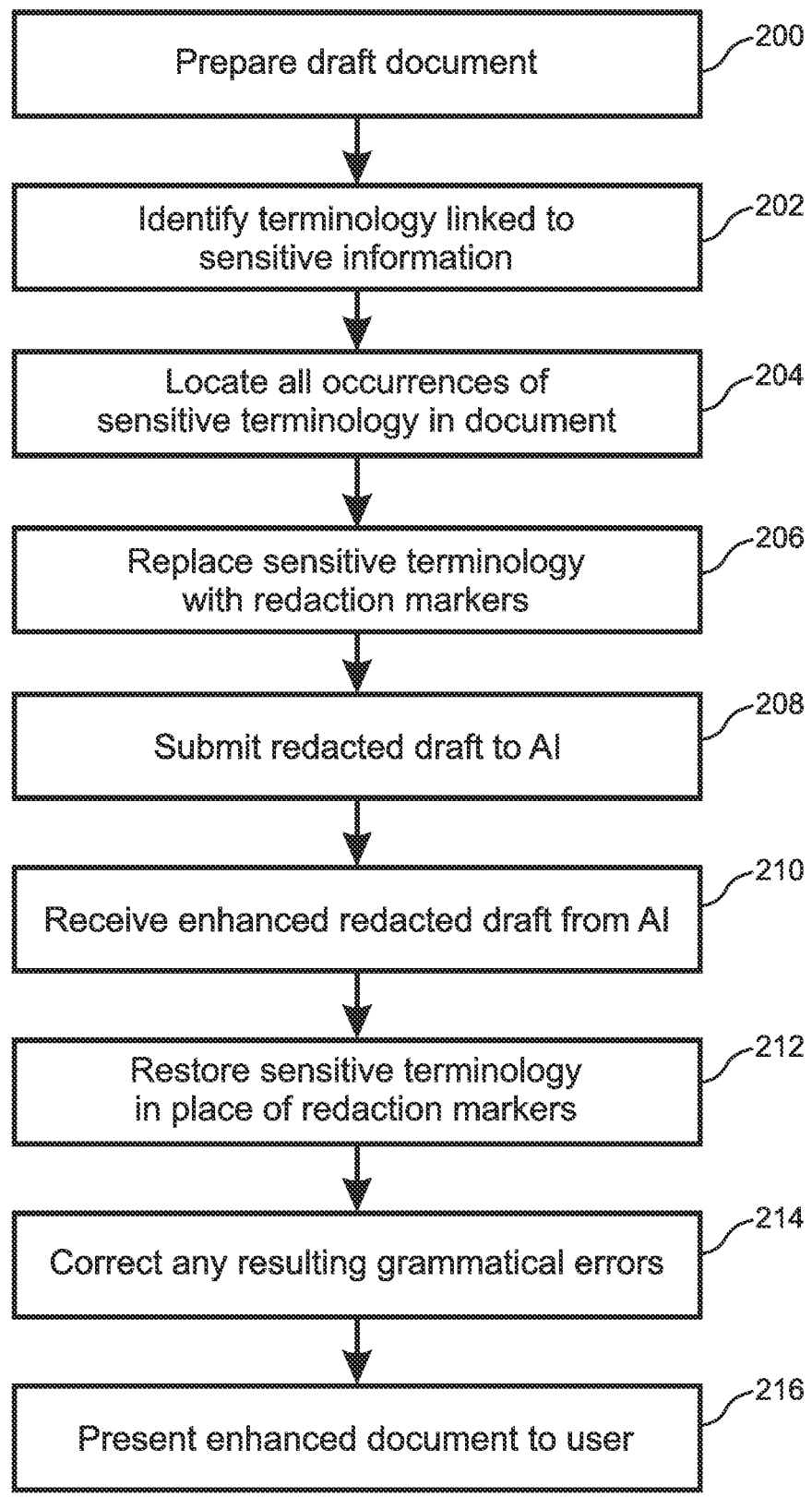
FIG. 2 is a flow diagram that illustrates an embodiment of the present invention.

FIG. 2 is a flow diagram that illustrates the present invention in more detail. In embodiments, a user prepares a draft document 200 that includes sensitive information, which is submitted to the exclusion filter. One or more words, phrases, and/or indicators, referred to herein collectively as the "sensitive terminology," and individually as the "sensitive terms," are identified 202, where omission of the sensitive terminology will successfully cause the sensitive information to be excluded from the document.

The exclusion filter is made aware of the sensitive terminology, based upon which it then creates a "redacted" draft by locating all occurrences of the sensitive terminology in the document 204, and replacing all of the sensitive terminology in the draft with "redaction markers" 206, thereby excluding the sensitive information from the redacted draft. The redacted draft is submitted to the remotely hosted AI 208, which returns an enhanced redacted draft to the filter 210 that, in general, contains most or all of the redaction markers. Upon receiving the enhanced redacted draft, the exclusion filter replaces the redaction markers with the original sensitive terms 212, thereby creating an enhanced document that is returned to the user 216. In embodiments, the exclusion filter automatically corrects any grammatical errors 214 in the enhanced document that may have arisen due to the replacement of the redaction markers with the original sensitive terminology.

The redaction markers can be any characters or groups of characters that is/are supported by the document standard of document, so long as a unique redaction marker is associated with each unique sensitive term, and so long as the redaction marker is highly unlikely to be interpreted by the AI as representing an actual word or phrase, for example a misspelled word that is known to the AI, and is also highly unlikely to be interpreted by the AI as being a "coined" word that might be subject to substitution with a term of art. Instead, redaction markers must be chosen that will likely be interpreted by the AI as being actual words or phrases that simply are not known to the AI.

The following series of tables present a very simple example of a chocolate chip cookie recipe for which a user is seeking AI improvement without giving away the secrets of his recipe. Of course, this is not intended to be a realistic example, but is presented merely to illustrate the disclosed method. The recipe with the user's original text is presented in Table 1. Note that the user likely has a limited command of the English language.

TABLE 1

User's original draft document

Ingredients
   1 cup salted butter softened
   1 cup white (granulated) sugar
   1 cup light brown sugar packed
   2 tsp pure vanilla extract
   2 large eggs
   3 cups all-purpose flour TABLE 1-continued User's original draft document 1 tsp baking soda
   ½ tsp baking powder
   1 tsp salt
   2 cups chocolate chips (or chunks, or chopped chocolate)
Instructions
Heat up oven to 375 deg. Put parchment paper in pan. Flour, soda, salt, and baking powder in bowl together. Smoosh butter and sugars, then with eggs and vanilla. Then chocolate chips. Place globs of dough on pan and bake 8-10 min. Should be light brown.

In this example, the user enters the entire recipe into a computer, and indicates the sensitive terms by surrounding them with pre-determined character strings, as shown in Table 2.

TABLE 2

User's draft document with sensitive terminology marked

Ingredients
   %%1 cup salted butter softened
   1 cup white (granulated) sugar
   1 cup light brown sugar packed
   2 tsp% pure vanilla extract
   2 large eggs
   3 cups all-purpose flour
   1 tsp baking soda
   ½ tsp baking powder
   1 tsp salt
   2 cups chocolate chips (or chunks, or chopped chocolate) %%
Instructions
Heat up oven to ##375## %%GNRI%%deg%%GNRI%%. Put parchment paper in pan. %%Flour%%, %%soda%%, %%salt%%, and %baking powder% in bowl together. Smoosh %%butter%% and %%sugar%%s, then with %%eggs%% and %%vanilla%%. Put it all together. Then %%chocolate chips%%. Place globs of dough on pan and bake ##8-10## %GNRI%min%GNRI%. Should be light brown.

Note that pairs of percentage signs "%%" have been used to surround and thereby identify the sensitive terms. In similar examples, the sensitive terms are identified by highlighting using a mouse. In this example, the entire list of ingredients in Table 2 has been denoted as being sensitive. Since it is a mere list, the user feels confident that it does not need to be enhanced. In a similar example, the user might simply exclude the list of ingredients from the document that is submitted to the AI. Note that the oven temperature of 375 deg. and the baking time of 8-10 min have been indicated to be sensitive indicators, where "deg" and "min" are the indicators and "35" and "8-10" are the "targets" of the indicators. In the example of Table 2, the symbols "##" have been used to identify the targets, which are to be redacted, while the symbols "% GNRI % have been used to identify the indicators themselves, where "GNRI" stands for "global non-redacted indicator," meaning that the indicators themselves are global indicators that should not be redacted. In similar embodiments, different colored highlighting is used to more conveniently identify different types of sensitive terms, for example, local vs. global and indicator vs. target.

Table 3 presents the redacted document as it is presented to the AI by the exclusion filter. Note that the redaction markers for words and phrases in this example are pairs of percentage signs with a sequentially advancing integer therebetween "%%1%%," "%%2%%," etc., while the targets of indicators are indicated as pairs of "hash" signs with sequential letters therebetween ##A ##, ##B ##, etc. Embodiments of the disclosed exclusion filter are able to generate randomized redaction markers that are changed from one document to the next, thereby reducing any chance that the AI will attempt to add the redaction markers to its vocabulary.

TABLE 3

Redacted document

Ingredients
%%1%%
Instructions
Heat up oven to ##A## deg. Put parchment paper in pan. %%2%%, %%3%%, %%4%%, and %%5%% in bowl together. Smoosh %%6%% and %%7%%s, then with %%8%% and %%9%%. Put it all together. Then %%10%%. Place globs of dough on pan and bake ##B## min. Should be light brown.

Of course, there is nothing to be enhanced in the ingredients section. However, even with redaction of the sensitive terminology much remains in the instructions to be enhanced by the AI. The result is presented in Table 4.

TABLE 4

Enhanced redacted document

Ingredients
%%1%%
Instructions
Preheat oven to ##A## degrees. Line a pan with parchment paper. Combine %%2%%, %%3%%, %%4%%, and %%5%% in a bowl. Set aside. Blend together %%6%% and %%7%%s, then add %%8%% and %%9%%. Combine all ingredients, and then add %%10%%. Place balls of dough on the lined pan and bake ##B## minutes. Cookies should be light brown in color.

Finally, the enhanced redacted document of Table 4 is returned to the exclusion filter, which restores the sensitive terminology in place of the redaction markers to provide the enhanced documents presented in Table 5.

TABLE 5

Enhanced document

Ingredients
  1 cup salted butter softened
  1 cup white (granulated) sugar
  1 cup light brown sugar packed
  2 tsp pure vanilla extract
  2 large eggs
  3 cups all-purpose flour
  1 tsp baking soda
  ½ tsp baking powder
  1 tsp salt
  2 cups chocolate chips (or chunks, or chopped chocolate)
Instructions
Preheat oven to 375 degrees. Line a pan with parchment paper. Combine flour, soda, salt, and baking powder in a bowl. Set aside. Blend together butter and sugars, then add eggs and vanilla. Combine all ingredients, and then add chocolate chips. Place balls of dough on the lined pan and bake 8-10 minutes. Cookies should be light brown in color.

Note that the redacted word "Flour" in the third sentence was originally capitalized in the draft document of Table 1, and was associated as such with redaction marker %%2%% in Table 3. Simple restoration of "Flour" in place of %%2%% in Table 5 by the exclusion filter would therefore result in a grammatical error. However, after direct restoration of the term "Flour" in place of redaction marker %%2%%, the exclusion filter has corrected this grammatical error by converting the first letter of the term "flour" to lower case.

In the embodiments of FIG. 1 and Tables 1-5, the sensitive information and associated sensitive terminology are identified by a user, who manually communicates the sensitive terms to the exclusion filter, for example by underlining or highlighting the sensitive terms in the draft document, or as in the case of Tables 1-5 by surrounding the sensitive terms with predetermined symbols.

In embodiments, for each word, phrase, or indicator, i.e. each "term," that is identified as being sensitive, the user can indicate whether it is only that occurrence of the term that is sensitive, or whether all occurrences of the identified term are sensitive. In other words, each sensitive term can be specified to be "locally" sensitive or "globally" sensitive. This can be done, for example, by using different colors of highlighting, or by using different symbol combinations to surround the sensitive terms. In various embodiments, the user can instruct the exclusion filter to consider all of the sensitive terminology to be global, or all of the sensitive terminology to be local. Or the user can indicate to the exclusion filter that each identification of a sensitive term will be accompanied by a designation of the sensitive term as being local or global. Use of the symbols "%% GNRI %% in Table 2 is an example of using specific symbol strings to indicate that the identified indicators are global.

In the example of Table 2, none of the sensitive terms are repeated, thereby minimizing the importance of designating sensitive terms as being local or global. However, in various embodiments, when a globally sensitive term is identified by a user, and is repeated in the draft document, the user can identify one instance of the sensitive term as an example, enabling the exclusion filter, by analogy, to identify the other occurrences of the same term in the draft document, and to also redact them.

In some embodiments, previously identified, globally sensitive terminology is stored in a database, or in a plurality of databases, that can be reference by users in the future who wish to globally exclude similar content from their documents. In some of these embodiments, each of a plurality of databases is directed to a specific category of globally sensitive terminology, thereby allowing users to easily tailor the sensitive content that is to be excluded from their draft documents. For example, even though none of the sensitive terms is repeated in the example of Tables 1-5, designating the sensitive terminology as being "global" can cause these terms, in embodiments, to be added to a database that is specifically directed to terminology that would be sensitive in a recipe. According to this approach, sensitive terms can be included in more than one of the databases if they are relevant to more than one of the sensitive information categories.

In the illustrated embodiment of Tables 1-5, the exclusion filter automatically interprets the addition of the letter "s" or letters "es" to a sensitive term as representing the plural of the same word, phrase, or indictor. For example, note that the letter "s" following the sensitive word "sugar" in table 2 is not included as part of the excluded word as marked by the user. This allows the exclusion filter to search for other occurrences of the word "sugar" both as singular and plural words.

In applications where a user relies mainly or entirely on pre-established databases of sensitive terminology, the action of the disclosed exclusion filter can be substantially "transparent" to the user, in that the user can submit a draft document containing sensitive information to a remotely hosted AI via the disclosed filter, and receive an enhanced document in return to which the sensitive information has been restored, without necessarily being aware that the sensitive information was excluded from the remotely hosted AI.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A method of enabling a remotely hosted artificial intelligence engine ("AI") to enhance a draft document containing sensitive information without revealing the sensitive information to the AI, the draft document being written in a document language and consisting of a plurality of symbols selected from a symbol set that is supported by a document standard, the method comprising:
   providing the draft document to a locally hosted exclusion filter;
   identifying to the exclusion filter at least one sensitive term included in the draft document, the removal of which would eliminate the sensitive information from the draft document, wherein:
      at least one of the sensitive terms is a sensitive target; and
      wherein identifying the sensitive target to the exclusion filter includes indentifying by the user to the exclusion filter a sensitive indicator directed to the sensitive target;
   creating by the exclusion filter of a redacted draft by replacing each of the identified sensitive terms in the draft document with a corresponding redaction marker, a unique one of the redaction markers corresponding with each unique one of the sensitive terms, each of said redaction markers consisting of one or more symbols that are supported by the document standard, none of the redaction markers including any series of symbols that is identical to, or confusingly similar to, any word included in the document language;
   submitting by the exclusion filter of the redacted draft to the AI;
   receiving by the exclusion filter of an enhanced redacted draft created by the AI from the redacted draft, said enhanced redacted draft including at least one of the redaction markers;
   creating by the exclusion filter from the enhanced redacted draft of an enhanced document by exchanging the redaction markers in the enhanced redacted draft with the corresponding sensitive terms; and
   presenting the enhanced document to the user.

2. The method of claim 1, wherein the sensitive terms comprise at least one of a sensitive word, a sensitive phrase, and the sensitive indicator.

3. The method of claim 1, wherein identifying the at least one sensitive term to the exclusion filter includes designating each of the sensitive terms as being a locally sensitive term, wherein only one nor more specific occurrences of the term are designated to be sensitive terms, or a globally sensitive term, wherein all occurrences of the term are designated to be sensitive terms.

4. The method of claim 3, wherein identifying the at least one sensitive term to the exclusion filter includes designating by the user of at least one of the sensitive terms as a globally sensitive term, and wherein the method further comprises adding said user-designated globally sensitive term to a database of globally sensitive terms.

5. The method of claim 4, wherein the designated database of globally sensitive terms is a database of sensitive terms that are deemed to be pertinent to a selected document category.

6. The method of claim 1, wherein identifying the at least one sensitive term to the exclusion filter includes specifying to the exclusion filter a database of globally sensitive terms, and identifying by the exclusion filter of all occurrences in the draft document of terms that are included in the specified database as being globally sensitive terms.

7. The method of claim 1, wherein the method further comprises correcting by the exclusion filter of at least one document error in the enhanced document arising from the exchanging by the exclusion filter of the redaction markers in the enhanced redacted draft with the corresponding sensitive terms.

8. The method of claim 1, wherein identifying to the exclusion filter the sensitive indicator includes identifying whether both the indicator and the target should be replaced by redaction markers, or only the target should be replaced by a redaction marker.

9. The method of claim 1, wherein:
   the sensitive indicator is a globally sensitive indicator having a plurality of occurrences thereof in the draft document;
   identifying to the exclusion filter the sensitive indicator includes selecting by the user of one of the occurrences in the draft document of the sensitive indicator as an example occurrence, and identifying as an example target the target to which the example occurrence of the indicator is directed; and
   the method further includes, based upon the example occurrence and the example target, identifying by the exclusion filter of the targets to which all of the other occurrences of the sensitive indicator in the document are directed.

10. The method of claim 1, wherein identifying to the exclusion filter the at least one sensitive term includes:
   identifying of the sensitive term to the exclusion filter in a singular format thereof; and
   interpretation by the exclusion filter of occurrences in the draft document of the identified sensitive term to which the letter "s" or the letters "es" have been appended to be occurrences of the sensitive term in a plural format thereof.

11. The method of claim 1, wherein providing the draft document to the exclusion filter includes providing a first draft document and a second draft document to the exclusion filter, and wherein for any sensitive term that occurs in both of the draft documents, the method further includes replacing each occurrence of the sensitive term in the first draft document with a first redaction marker and replacing each occurrence of the sensitive term in the second draft document with a second redaction marker that is not identical to the first redaction marker.

12. Non-transient media containing instructions stored therein that are configured, upon execution thereof by a computing device, to carry out the steps of:
   receiving a draft document written in a document language and consisting of a plurality of symbols selected from a symbol set that is supported by a document standard;
   receiving identification from a user of at least one sensitive term included in the draft document;
   creating a redacted draft by replacing each of the sensitive terms in the draft document with a corresponding redaction marker, a unique one of the redaction markers corresponding with each unique one of the sensitive terms, each of said redaction markers consisting of one or more symbols that are supported by the document standard;
   submitting of the redacted draft to an AI;
   receiving from the AI an enhanced redacted draft that includes at least one of the redaction markers;
   creating from the enhanced redacted draft an enhanced document by exchanging the redaction markers in the enhanced redacted draft with the corresponding sensitive terms; and
   presenting the enhanced document to the user.

13. The non-transient media of claim 12, wherein the instructions are further configured, upon execution thereof by the computing device, to add user-designated globally sensitive terms to a database of globally sensitive terms.

14. The non-transient media of claim 12, wherein the instructions are further configured, upon execution thereof by the computing device, to identify all occurrences in the draft document of terms that are included in a specified database as being globally sensitive terms.

15. The non-transient media of claim 12, wherein the instructions are further configured, upon execution thereof by the computing device, to correct at least one document error in the enhanced document arising from the exchanging by the exclusion filter of the redaction markers in the enhanced redacted draft with the corresponding sensitive terms.

16. The non-transient media of claim 12, wherein the instructions are further configured, upon execution thereof by the computing device, to identify targets to which occurrences of a sensitive indicator in the document are directed according to an example occurrence of the indicator and target identified by the user.

17. The non-transient media of claim 12, wherein the instructions are further configured, upon execution thereof by the computing device, to interpret occurrences in the draft document of identified sensitive terms to which the letter "s" or the letters "es" have been appended to be occurrences of the sensitive terms in a plural format thereof.

18. The non-transient media of claim 12, wherein the instructions are further configured, upon execution thereof by the computing device, to replace each occurrence of a sensitive term in first and second draft documents with corresponding first and second redaction markers that are not identical to each other.

* * * * *